(12) United States Patent
Veneziano

(10) Patent No.: US 9,769,433 B2
(45) Date of Patent: *Sep. 19, 2017

(54) VIDEO CAMERA DEVICE AND METHOD TO MONITOR A CHILD IN A VEHICLE

(71) Applicant: Giuseppe Veneziano, Monterey Park, CA (US)

(72) Inventor: Giuseppe Veneziano, Monterey Park, CA (US)

(73) Assignee: Baby-Tech Innovations, Inc., Montebello, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/382,149

(22) Filed: Dec. 16, 2016

(65) Prior Publication Data

US 2017/0104963 A1    Apr. 13, 2017

Related U.S. Application Data

(63) Continuation of application No. 13/663,929, filed on Oct. 30, 2012, now Pat. No. 9,565,402.

(51) Int. Cl.
*H04N 7/18* (2006.01)
*H04N 5/225* (2006.01)
(Continued)

(52) U.S. Cl.
CPC ............. *H04N 7/183* (2013.01); *B60R 1/008* (2013.01); *H04N 5/2252* (2013.01);
(Continued)

(58) Field of Classification Search
CPC ....................................................... H04N 7/183
See application file for complete search history.

(56) References Cited

U.S. PATENT DOCUMENTS 5,790,031 A * 8/1998 Shelton ............. B60R 21/01556
180/273
6,198,502 B1 * 3/2001 Watkins ............... B60N 2/4876
348/148

(Continued)

OTHER PUBLICATIONS

Nanny 360, The First Wireless Baby Monitor for Car and Home Use, 2012, 2 pages, http://www.nanny360.com/ Copyright Nanny 360 2012.

(Continued)

*Primary Examiner* — Jay Patel
*Assistant Examiner* — Irfan Habib
(74) *Attorney, Agent, or Firm* — Law Offices of David L. Romero; David L. Romero

(57) ABSTRACT

The present invention is directed to a system and methods of monitoring a child seated in the rear seat of a vehicle in a child's car seat employing a video camera which transmits a video signal to a video display receiver placed in the driver's frame of vision. The video camera as envisioned herein is placed within a child's stuffed toy, the camera signal being transmitted remotely to a separate video display monitor screen device, viewable to the parent driving the vehicle. The camera is adjustable in the number of positions in which it is placed in the vehicle compartment as well as the direction in which the camera is directed. To adjust the direction in which the camera is pointed, the invention includes a bendable, flexible and sturdy neck that interconnects the camera to a transmission unit, which provides the driver with a view of the child.

14 Claims, 15 Drawing Sheets

(51) Int. Cl.
  *H04N 5/33* (2006.01)
  *H04N 5/232* (2006.01)
  *B60R 1/00* (2006.01)
  *H04W 84/12* (2009.01)
  *H04W 4/00* (2009.01)

(52) U.S. Cl.
  CPC ....... *H04N 5/2256* (2013.01); *H04N 5/23206* (2013.01); *H04N 5/23293* (2013.01); *H04N 5/33* (2013.01); *B60R 2300/103* (2013.01); *B60R 2300/8013* (2013.01); *H04W 4/008* (2013.01); *H04W 84/12* (2013.01)

(56) References Cited

U.S. PATENT DOCUMENTS

| | | | | |
|---|---|---|---|---|
| 6,215,518 | B1* | 4/2001 | Watkins | B60N 2/4876 296/37.6 |
| 6,264,521 | B1* | 7/2001 | Hernandez | H04N 7/185 348/151 |
| RE37,709 | E | 5/2002 | Dukek | |
| 6,445,408 | B1* | 9/2002 | Watkins | B60N 2/4876 224/275 |
| 6,448,895 | B1* | 9/2002 | Ekkel | G08B 5/40 340/573.1 |
| 6,690,268 | B2 | 2/2004 | Schofield et al. | |
| 6,773,344 | B1* | 8/2004 | Gabai | A63H 3/28 463/1 |
| 6,819,249 | B1* | 11/2004 | Papp | B60N 2/002 307/10.1 |
| 7,019,794 | B2* | 3/2006 | Norvell | B60R 11/0235 248/918 |
| 7,248,170 | B2* | 7/2007 | DeOme | G08B 13/19621 340/541 |
| 7,378,974 | B1* | 5/2008 | Bassett | G08B 21/02 340/573.1 |
| 7,482,927 | B2* | 1/2009 | Livingston | G06Q 10/08 340/286.06 |
| 7,551,523 | B2* | 6/2009 | Larian | G04C 21/00 368/244 |
| 7,714,737 | B1* | 5/2010 | Morningstar | B60N 2/002 180/271 |
| 8,292,364 | B2* | 10/2012 | Liu | B60N 2/4876 297/217.3 |
| 8,636,558 | B2* | 1/2014 | Eyzaguirre | A63H 3/28 446/330 |
| 8,801,490 | B2* | 8/2014 | Achan, Jr. | A63H 3/003 446/227 |
| 8,827,760 | B2* | 9/2014 | Ushibo | A63H 3/003 446/268 |
| 8,894,461 | B2* | 11/2014 | Horovitz | A63H 33/00 446/175 |
| 9,266,471 | B2* | 2/2016 | Schoenberg | B60N 2/002 |
| 2002/0106965 | A1* | 8/2002 | Dooley | A63H 30/04 446/454 |
| 2003/0027636 | A1 | 2/2003 | Covannon et al. | |
| 2003/0137584 | A1* | 7/2003 | Norvell | B60R 11/0235 348/61 |
| 2004/0004378 | A1* | 1/2004 | Park | B60N 2/4876 297/217.3 |
| 2004/0056954 | A1* | 3/2004 | Crandall | H04N 7/183 348/148 |
| 2004/0090525 | A1* | 5/2004 | Eichmann | B60R 1/00 348/148 |
| 2004/0180603 | A1 | 9/2004 | Barri et al. | |
| 2004/0227815 | A1 | 11/2004 | Chen | |
| 2005/0125123 | A1* | 6/2005 | Kageyama | B60R 1/008 701/36 |
| 2005/0151844 | A1* | 7/2005 | Chiao | H04N 7/183 348/148 |
| 2006/0047375 | A1* | 3/2006 | Eichmann | B60R 1/00 701/1 |
| 2006/0103516 | A1* | 5/2006 | Zang | B60N 2/002 340/457 |
| 2006/0164230 | A1* | 7/2006 | DeWind | B60K 35/00 340/461 |
| 2006/0208911 | A1* | 9/2006 | Davis | B60N 2/26 340/573.4 |
| 2006/0234602 | A1* | 10/2006 | Palmquist | A63H 3/003 446/297 |
| 2007/0273524 | A1* | 11/2007 | Lee | B60N 2/002 340/572.1 |
| 2008/0088437 | A1* | 4/2008 | Aninye | G07C 9/00111 340/539.13 |
| 2008/0164990 | A1* | 7/2008 | Anderson | B60N 2/002 340/457 |
| 2008/0214089 | A1 | 9/2008 | Vermac et al. | |
| 2008/0252118 | A1* | 10/2008 | Chang | B60R 11/0235 297/217.3 |
| 2008/0309765 | A1* | 12/2008 | Dayan | H04N 7/185 348/158 |
| 2009/0091617 | A1 | 4/2009 | Anderson | |
| 2009/0127897 | A1* | 5/2009 | Watanabe | B60R 11/0235 297/188.04 |
| 2009/0174774 | A1* | 7/2009 | Kinsley | B60R 1/00 348/148 |
| 2009/0234542 | A1* | 9/2009 | Orlewski | B60N 2/002 701/45 |
| 2009/0290021 | A1* | 11/2009 | Rudesill | B60R 1/008 348/148 |
| 2009/0303025 | A1* | 12/2009 | Wahlstrom | B60R 25/1004 340/429 |
| 2010/0060448 | A1* | 3/2010 | Larsen | A63H 33/006 340/539.15 |
| 2010/0091102 | A1* | 4/2010 | Rudell | G02B 21/0008 348/79 |
| 2011/0269365 | A1* | 11/2011 | Goff | A63H 3/28 446/72 |
| 2012/0164911 | A1* | 6/2012 | Achan, Jr. | A63H 3/02 446/72 |
| 2012/0315820 | A1* | 12/2012 | Goff | A63H 3/28 446/297 |
| 2013/0021476 | A1* | 1/2013 | Trummer | B60R 22/48 348/148 |
| 2013/0049955 | A1* | 2/2013 | Hoover | B60N 2/28 340/539.11 |
| 2013/0201013 | A1* | 8/2013 | Schoenberg | B60R 22/48 340/438 |
| 2013/0278408 | A1* | 10/2013 | Schoenberg | B60N 2/002 340/457 |
| 2014/0256214 | A1* | 9/2014 | Ramamoorthy | A63H 3/28 446/297 |

OTHER PUBLICATIONS

PCT Notification of Transmittal of International Search Report and the Written Opinion of the International Searching Authority for PCT/US2013/067237 dated Feb. 7, 2014 and its entire file history related to prior filed U.S. Appl. No. 13/663,929, now U.S. Pat. No. 9,565,402.

* cited by examiner

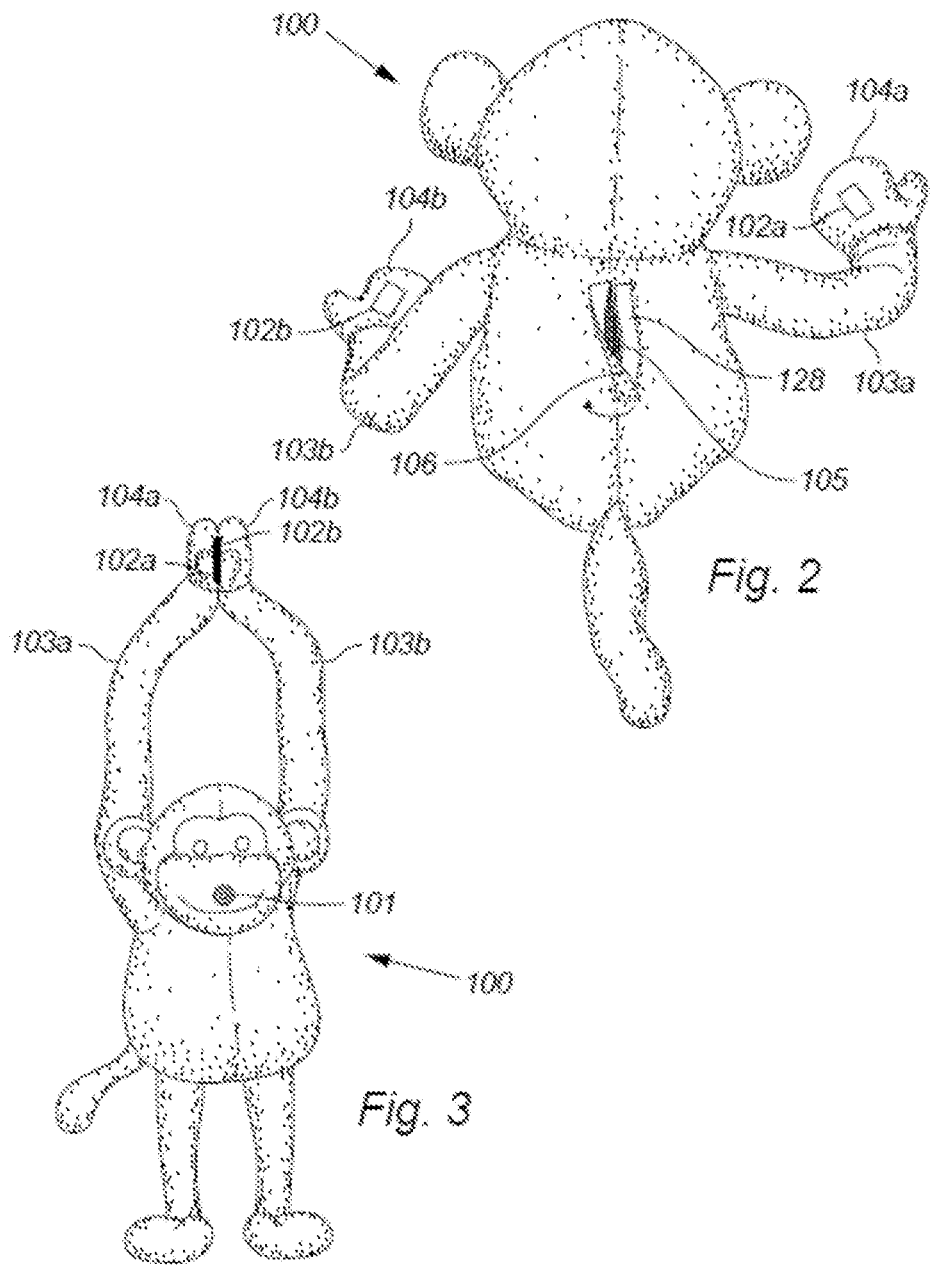

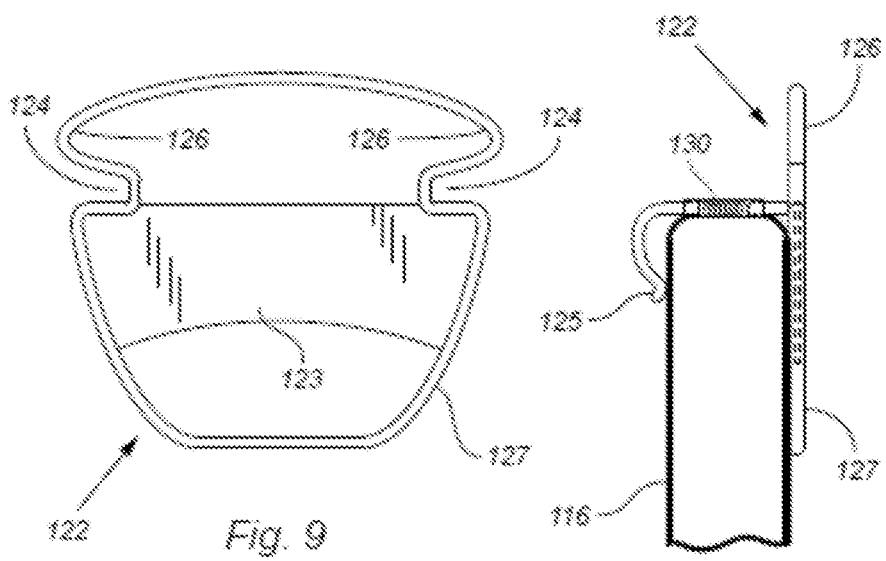
Fig. 9
Fig. 10
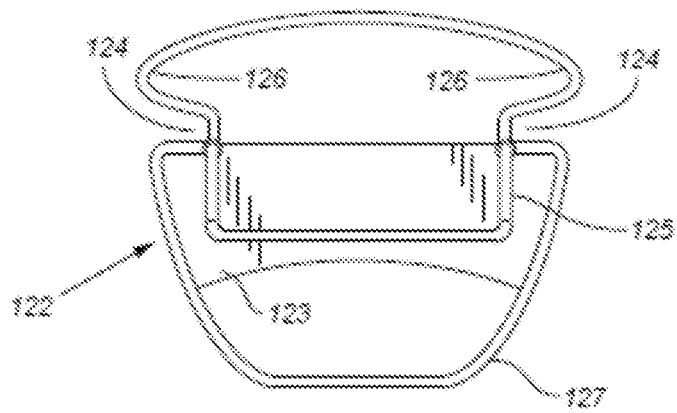
Fig. 11

VIDEO CAMERA DEVICE AND METHOD TO MONITOR A CHILD IN A VEHICLE

The present application claims priority to U.S. Non Provisional application Ser. No. 13/663,929, filed Oct. 30, 2012, the contents of which are hereby incorporated in their entirety.

FIELD OF THE INVENTION

The present invention relates generally to child monitoring and video display device. Specifically, the invention relates to camera and video display device, with the camera placed hidden inside a child's stuffed animal and the video display device situated on the dashboard of the parent's vehicle. The video display device and hidden camera allow the parent to view the child in the backseat without the need of turning around during operation of the vehicle by the parent

BACKGROUND OF THE INVENTION

Child monitoring and video/audio devices for child monitoring are well known in the art. Audio devices that transmit a baby's cries to a remotely placed receiver, within ear shot of the child's parents, have been used since the 1970's. Technology continues to produce ever increasing and clever inventions to keep parents informed of the status of their children either through visual means, audio or both.

The use of such technology and electronic media has increased exponentially with the increased availability of cheap and inexpensive video and audio monitoring technology over the past 5 to 10 years. Effective monitoring of children during early childhood has become a paramount concern to parents and the market has sought to address this concern with numerous devices. One drawback to modern monitoring technology and equipment is that it is often very expensive to the average consumer and also, difficult to set up for effective monitoring of children in their typical household setting. One instance in particular, in which parents have virtually no capability of monitoring their children is during transport of the child placed in his or her child's car seat during vehicle travel. Federal and state regulations require that infant car seats face backward and as such, parents, most often driving alone, are unable to view their child to any extent whatsoever during periods of vehicular travel. Accordingly, parents are unable to ensure that children are free of choking hazards and are generally safe from any potential hazard.

Moreover, it is not generally feasible and overall, an unsafe practice, for parents to pull over to the side of a highway in order to check on children. As result, parents often resort to taking their attention from the road and to checking the welfare of their children by turning around to view their children in the backseat The prior art is replete with systems and methods that seek to effectively quell the concerns of parents in providing video monitoring devices. For example, "Electronic Baby Remote Viewer", U.S. Patent Publication Number 2009/0091617 to Anderson describes a babe remote viewer that includes a digital camera lens, a digital viewing screen, a zoom feature and a zoom activation button. The digital camera lens is described as configured for mounting into a position adjacent to a region to be viewed, with the region to be viewed located at some distance remote form the user of the electronic babe remote viewer. The areas to be viewed, as described therein, can be an infant's crib in a bedroom or in a car seat mounted into the rear seat of a vehicle.

The digital camera is described as being configured in a unit that is separate from the digital viewing screen, with the digital screen being configured to be portable so that a parent may take it to any location and be able to monitor the child from that location. The device however suffers from the inability to direct the video camera in a desired direction. Further, the invention is merely a video camera and provides no entertainment to the child.

Also, U.S. Patent Publication Number 2009/0290021 to Rudesill et al., for a "Rear Seat Passenger Surveillance System", describes a rear seat passenger camera and display system for use in an automobile. The application further describes mounting of the camera on the headline panel on the interior of the vehicle compartment with mounting in a substantially central location of the vehicle compartment, the lens of the camera pointing downward to view the entire compartment of the vehicle. As described therein, the camera consists of a miniature video camera mounted in the rear of the vehicle so that it will point toward the back seat where a child is seated in a child's car seat.

The application further describes a separate video component comprised of a 2 to 4 inch monitor screen built into or position on the dashboard of the vehicle. Although the application describes mounting in a central or rear location, the device is described as being mountable in different positions throughout the vehicle compartment. The invention however, suffers from the shortcoming that the two components, the camera and the video display, must be hard wired in order to function, with a wireless element not described therein. Further, the camera, as in the Anderson device, cannot be adjusted to a desired direction. The number of mountable positions in a vehicle compartment is typically very limited and the device must necessarily be mounted in one of the few positions within the vehicle in order to effectively monitor the child in the back seat. Furthermore, vehicle types vary in the number of available mounting positions and the device suffers from an inability to accommodate every vehicle equally effective. The present invention describes among other claimed elements, the ability to use a flexible "neck" in which the camera can be directed in any direction in the vehicle compartment without the need of physically mounting the camera in any particular position in the vehicle. Further, the Rudesill device like Anderson, fail to provide entertainment value to the child with a decoratively camouflaged camera device.

Finally, United States Patent Publication Number 2009/0174774 to Kinsley, "Video System for Viewing Vehicle Back Seat", describes a portable video system for viewing a vehicle back seat which has at least one swivel or rotatable camera encased in the soft frame of a transmitting unit that is mounted in the interior of a vehicle. The application further describes the device as consisting of a transmitting unit which includes a USB and a video display screen, and a reflecting mirror or other stimulus within its frame that consists of speakers and volume control.

The camera is transmitted to a receiver and viewable by a display screen located within the driver's view. As with the other devices described above, the invention lacks the ability of customized adjustment within the compartment of a vehicle and to direct the camera and camera lens to any position within the vehicle. In this and other inventions, the camera can be mounted in only a few positions within the vehicle, which in many instances, won't provide the proper perspective to view the child at all times. Likewise, the Kinsley device fails to provide an aesthetically pleasing view for the child.

Modern safety measures and statutes require young children to be secured in the backseat child's seat and in the case of infants, child safety seats are typically rear facing. This requirement prevents the parent or caretaker who is driving to be able to fully monitor the child. In such a scenario, the driver ends up turning around continuously to check on the child or attempt to soothe the infant. Taking their eyes and hands off of the road to tend to the child creates a driving hazard and is extremely unsafe. A more efficient alternative is needed. The invention described herein, addresses this need.

SUMMARY OF THE INVENTION

The present invention is directed to a system and methods of monitoring a child seated in the rear seat of a vehicle in a child's car seat employing an adjustable video camera which transmits a video signal to a video display receiver placed in the driver's frame of vision such as for example, on the vehicle dashboard. The video camera as envisioned herein is situated and hidden within a child's stuffed toy, the camera signal being transmitted remotely to a separate video display screen device, which is viewable to the parent driving the vehicle. The camera is adjustable both in the number of positions in which it is placed in the vehicle compartment as well as the direction in which the camera is pointed. To adjust the direction in which the camera is pointed, the invention provides a bendable, flexible and sturdy neck that interconnects the camera to a transmission unit, the transmission device transmitting the video signal to the video display receiver and providing the adult parent with a constant view of the child during times of traveling.

Also described herein is a video surveillance system for monitoring children in the rear seat of a vehicle, which includes a video camera placed within a child's toy and a means of mounting the toy in the rearward compartment of the vehicle. The toy is configured with arms that can be wrapped around items in the rearward compartment of the vehicle in order to secure the toy in a desired location. The surveillance system further includes a video display monitor situated and secured in an area within the view of a driver of the vehicle with the video display monitor being linked remotely with said video camera to transmit video images to the video display monitor. Further, the video camera is configured to be adjustable within the toy by means of flexible, rigid tubing which houses a video camera cable, so that the camera can be directed to any desired location within the vehicle compartment in order to view the child.

BRIEF DESCRIPTION OF THE DRAWINGS

FIG. 2 depicts the basic configuration of the rear view of the plush toy. As shown, the plush toy is fitted with a Velcro opening to allow for placement of the video camera device therein.

FIG. 3 depicts the basic configuration of a forward view of the plush toy with the toy's hands clasped with Velcro attachments. The video camera lens is placed in the toy's nose.

FIG. 9 depicts a portable mounting device, or toy mount of the claimed invention in which the plush toy can be fastened in the absence of a vehicle headrest. As contemplated herein, the figure shows the embodiment that is fastened to an appropriate section of the rear seat upon which the toy can be fastened thereon.

FIG. 10 depicts a profile view of the portable mounting device, or toy mount that is fastened to any appropriate area in the rear seating area of a vehicle. As shown, the toy mount is adjustable by use of a spring that is employed to allow the mount to flex in various directions.

FIG. 11 depicts the portable mounting device, or toy mount of the invention and shows additional elements that allow fastening to various areas of the rear seat of a vehicle either with or without a headrest.

DETAILED DESCRIPTION OF THE INVENTION

Figure 1:
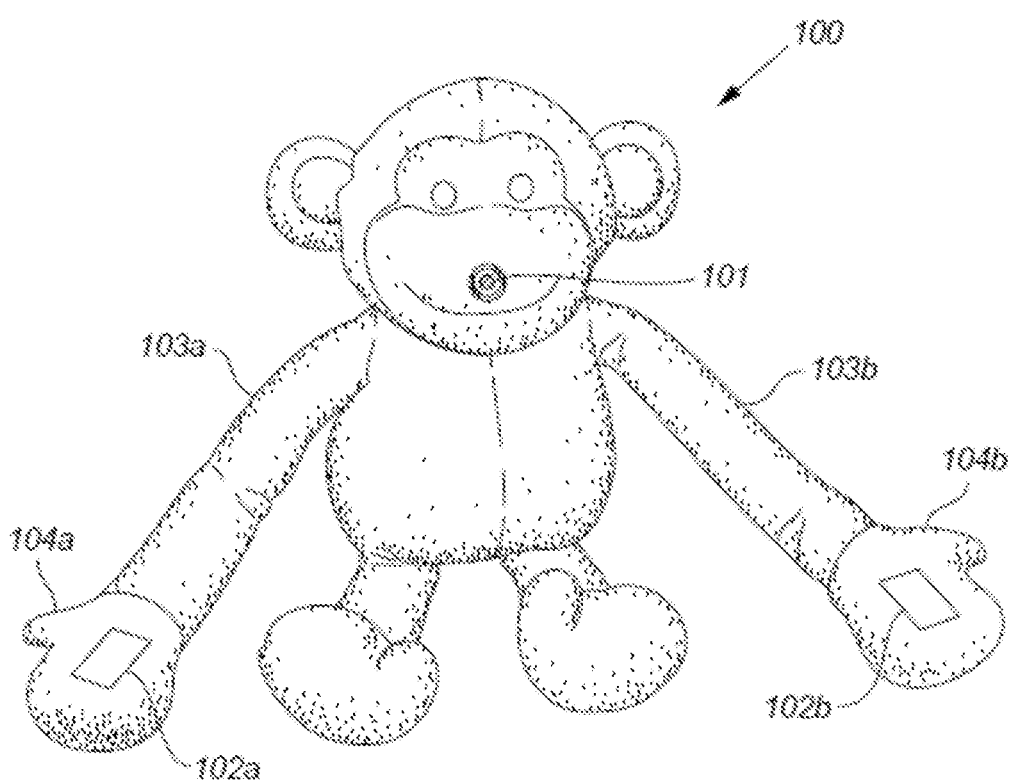
FIG. 1 depicts the basic configuration of a plush toy of the invention that incorporates the video camera device and elements of the invention. As shown, the video camera lens is situated in the plush toy's nose and has Velcro clasping at each of the toy's hands.

The present invention is directed to a system and methods of monitoring a child seated in the rear seat of a vehicle in a child's car seat employing an adjustable video camera which transmits a video signal to a video display receiver placed in the driver's frame of vision such as for example, on the vehicle dashboard. The video camera as envisioned herein is situated and hidden within a child's stuffed toy, the camera signal being transmitted remotely to a separate video display screen device, which is viewable to the parent driving the vehicle. The camera is adjustable both in the number of positions in which it is placed in the vehicle compartment as well as the direction in which the camera is pointed. To adjust the direction in which the camera is pointed, the invention provides a bendable, flexible and sturdy neck that interconnects the camera to a transmission unit, the transmission device transmitting the video signal to the video display receiver and providing the adult parent with a constant view of the child during times of traveling.

The present invention is a wireless monitoring system that allows parents and caregivers to view an infant in a rear facing car seat while driving. To do so, the invention provides a video display receiving device that is placed in the center console area of the vehicle, while a stuffed child's toy with an integrated camera and transmitter is placed in the backseat, facing the infant car seat, to provide real-time video of the child. The invention therefore, eliminates the need for the driver to turn around to check on the child. It also allows the driver/parent/caregiver to have a clear, unobstructed view of the child at all times.

In a preferred embodiment, the invention provides monitoring system for an infant in a rear facing car seat. The invention is comprised of a stuffed animal with Velcro fasteners, or other fasteners as known in the art, on the hands that will fasten around a headrest of a seat or other appropriate apparatus located in the rear interior of the vehicle compartment. The stuffed animal's nose, or other area on the toy, provides a position for the video camera to be placed in a hidden manner so that the child is unaware that the camera is present. The camera will typically operate during the day and however, the invention further provides use at night through use of a night vision function which transmits a video signal in the dark. The stuffed toy is positioned to face the infant in the rear-facing seat during periods of travel.

The video transmitted from the camera will then be displayed on a dash-mounted screen. The video display screen/receiver can also be placed anywhere on the interior of the vehicle compartment where desired. Preferred embodiments of the video display device include but are not limited to GPS capable devices (i.e., Garmin) or any smart phone capable of video display. In addition, the video display employed also includes factory, built-in video displays such as "in-dash" GPS navigation screens. In the event the vehicle does not possess headrests in the back seat area, the invention provides additional accessories to mount the stuffed animal accordingly.

A preferred embodiment of the invention employs Wi-Fi in intelligent vehicle, outfitted with a Wi-Fi source and/or Bluetooth capability, with images of one or more children transmitting to the vehicle's in-dash monitoring system. In addition, the invention is configured with an "app" capable of powering the invention on and/or off remotely from a smart phone or smart device such as a tablet for example. Remote on and off capability is also accomplished by employing a remote control device of the invention configured to control the power supply of the invention.

Another preferred embodiment of the invention includes a pan, tilt and zoom capability to monitor various areas of the vehicle compartment. The zoom capability allows a user to get an up close view of a child, or will allow monitoring of more than one child at once, when zoomed out. As part of monitoring more than one child simultaneously, the invention also provides more than one camera as well as a split screen monitor feature wherein more than one child can be monitored simultaneously.

As envisioned, the invention is configured with at least two video cameras situated within the head of the plush toy, wherein each camera is maneuvered and controlled remotely by a user via Wi-Fi and/or Bluetooth capability within the vehicle, by either a smart phone or via monitor on an in-dash monitor of an intelligent vehicle.

As envisioned herein, the invention also includes a safety feature that alerts a user/parent/drive in the event that a child is inadvertently left unattended in the rear compartment of the vehicle. The invention also provides for monitoring of the temperature immediately around the child or children and alerts the driver/user/parent that the child is too hot and that ventilation is required. The invention further provides a power supply indicator that alerts a user/parent/drive when battery power of the invention is low and recharging necessary.

The invention further provides the capability of playing streaming music or music from a CD player, radio or the like, through Wi-Fi and/or Bluetooth connectivity. The invention further provides music streaming capability from a music "app" downloaded onto a smart device such as a smart phone, tablet or the like. The invention is also configured to include two-way voice communication between the driver/parent/user and the child or children in order to soothe the distressed child.

In vehicles without a headrest, the invention provides a portable and adjustable mount that can be installed to the backrest of the vehicle rear seat. The mount includes but is not limited to a narrow (i.e., ~12 gauge thick) metal tubing made up of various materials that provide rigidity as well as flexibility to areas in which the camera/toy can be mounted.

The mount is manufactured with a sturdy material such as for example, spring steel tubing. The upper portion extends upwardly so that a user can wrap the toy's arms around during times of travel, the slots that can be used to wrap the toy's arm around, the plate that is employed to rest upon the rear seat and the lower portion that extends downwardly to secure the mount to the rear seat or other area in the rear section of the vehicle compartment.

The mount is configured with an extending clip that can be fitted around the top portion of a seat in order to secure the mount thereto. Also provided is a spring mechanism and securing clip that holds the mount securely to the seat and allows flexibility of the mount so that it fits a variety of shapes and areas in the rear seat or rear compartment area. The lower portion of the mount extends downwardly providing added security of the mount.

The mount is secured to any appropriately desired location within the vehicle compartment by means of a ball joint flexible mounting apparatus that can be secured to a desired location within the vehicle compartment. Other stuffed toys are envisioned herein including but not limited to tigers, giraffes, lions, pandas and other appropriately shaped toys. In a preferred embodiment, the hands of the stuffed toy are fitted with Velcro or other appropriate material so that the hands can be clasped together and the arms hung around the backseat vehicle headrest or optionally, the portable mount described herein.

Another preferred embodiment of the invention includes a camera unit within the stuffed plush animal, such as for example, within the head of the animal, the camera being employed with a wireless external monitor. A gasket made of latex rubber or other appropriate material is fitted around the opening in the stuffed toy that fits the camera lens. Related to the preferred embodiment is a camera unit in the plush stuffed animal employed in conjunction with a smart phone which has installed on it an appropriate "app", application using Bluetooth or Wi-Fi which acts to connect the smart phone to the camera located within the stuffed toy. As envisioned herein, the smart phone connects to the camera via Wi-Fi or Bluetooth with the app downloaded and installed on the smart phone. The app provides and shows the driver video images of the baby during times of travel. The app uses a warning disclaimer as the app is opened and an "I Agree" button is pressed in order to start the streaming. The app provides features to stream video, record streaming video, record still pictures, and also a caller ID bar that gives the option of accepting to answer or decline a call.

In a related embodiment, the invention provides a camera unit in a stuffed toy that is connected to the factory installed GPS or other monitor in dashboard via Bluetooth or Wi-Fi connection. In yet another embodiment of the invention the camera unit is mounted in several areas within the vehicle compartment and links with factory in-dash monitors by use of Bluetooth or Wi-Fi technology that connect the camera to the factory installed monitor in-dash.

Specifications of the invention include but are not limited to wireless capability to 2.4 GHz with universal mounting for multiple positions. Monitor and camera units use lithium polymer battery that is rechargeable. Other aspects of the invention include but are not limited to wireless blue tooth and Wi-Fi capable functionality to electronically link the camera unit with the video display monitor device.

As envisioned herein, any appropriately shaped stuffed or other type of toy capable of holding a camera unit and accompanying battery pack can be employed in practicing the present invention. For example, any toy with stuffing that allows the placement of the camera within the toy out of sight of the child viewing the invention can be employed. An opening in the back of the stuffed toy allows placement of the camera unit inside the toy. The camera can also be fitted with night vision capability for instances in which the child is driving with a parent at night. An anti-glare lens is optional as well in order to minimize glare from sun entering the vehicle. Vehicle adapter functionality is also envisioned herein in order to charge the video display and camera units when battery life is short. In order to save battery life, an "auto-off" feature is provided to minimize battery drain when the monitor to camera signal is cut off.

The invention is further configured with connectivity to modern so-called "intelligent" vehicles employing the vehicle's Wi-Fi source, or Bluetooth connectivity configured into the invention.

The term "intelligent vehicle" or the like, as used herein refers to any vehicle which is equipped with intelligent vehicle technologies. As generally understood in the art, intelligent vehicle technologies commonly apply to car safety systems and self-contained autonomous electromechanical sensors generating warnings that can be transmitted within a specified targeted area of interest, typically within 100 or more meters of the transceiver. In ground applications, intelligent vehicle technologies are utilized for safety and commercial communications between vehicles or between a vehicle and a sensor along the road.

Intelligent vehicle technologies provide instantaneous on the road information to the motorist who wishes to map a route to a specific destination and expects the system to assist in determining the best course of travel. The information provided by the in-vehicle system updates approximately every minute (depending on the speed of the vehicle) all the transmitter beacon information self-recorded by the vehicle while traveling on the road. That is, all vehicles traveling on the highway update such information to the local mile markers via DSRC telematics. The mile markers in turn communicate with the regional monitoring station and upload data so as to populate statistical bar graph trend of traffic flow progression. The information further made available for access to the date collected by the system established data exchange format through standard Internet protocol IP address communications links The term also refers to vehicles equipped with a Wi-Fi source. The term also refers to vehicles equipped with Bluetooth connectivity. The term further refers to any vehicle with the capability of interfacing with a smart device including but not limited to tablets, phones and the like.

The term "smart device" and the like, as used herein refers to electronic equipment or instrumentation with technology that allows a user to connect to the internet, includes a Wi-Fi source, Bluetooth connectivity, or computer-assisted communication or driving assistance. Examples of a smart device include but are not limited to a smart phone, a tablet, or other devices of similar nature and kind as are generally understood and known in the art.

The term "linked", "linked to" and the like as used herein refers to the electronic connection between a transmitting video device and a video display receiver. Specifically, the term refers to such connections as they are established by means known in the art such as for example, Bluetooth, cell phone tower or Wi-Fi signal connections.

As used herein, the term refers to the ability of a camera device to transmit analog or digital video signals generated by a video camera and transmitted therefrom to a video display receiver. The term can also be used in reference to a connection between two devices by a hard wire cable or like device. The term "link" also refers to the connection between the camera and the battery-pack which are both situated within the toy and is generally referred herein as a linking cable between the camera and the battery/power-pack employed as the power source for the camera.

In order to place the camera in a desired location, the camera is fitted with a bendable, flexible yet sturdy "neck" which is fitted through the stuffed toy's neck and which allows a user to adjust the direction to which the camera is pointed. As an added safety measure, and in order to minimize instances in which a child may inadvertently forgotten in the back seat, during instances in which the power or signal is cut off between the camera and the video display device, a 15 second audible alert will sound in order to inform the adult that the child is situated in the back seat.

A preferred embodiment of the video display device includes a 3.5" video monitor that can be either a portable device or a factory installed GPS-type video display which has been linked with the camera unit via a Bluetooth or Wi-Fi connection. A car-charging adapter is also provided for easy recharging of the lithium ion battery. Also, a USB capable connection is envisioned which allows the user to connect the camera and/or video display device to a computer for quick and easy recharging of the device. A secure digital (SD) memory card is also included in the video display device so to record the video for later review by parents if desired.

The invention further provides a wireless embodiment so that the transmitting video camera can be conveniently placed at any distance from the video receiver within the interior of the vehicle with transmission of the video signal occurring wirelessly. The system further provides an added safety feature by producing an audible sound that beeps for 15 seconds after the signal from the monitor to the stuffed animal and transmitter is disconnected (when the vehicle is turned off) so that the parent or guardian does not forget that the infant is in the vehicle.

Turning now to the substance of FIGS. 1 to 12 and the preferred embodiments of the system and methods of the present invention. FIG. 1 illustrates the plush toy of the invention 100 that incorporates use of a video camera 107 and camera lens 101 in the nose of the animal, which, as envisioned herein, can be any animal toy. Further illustrated is the toy's long arms 103a, 103b fitted with hands 104a, 104b that are fitted with Velcro 102a, 102b, in order to clasp when placed together.

FIG. 2 illustrates a rear view of the animal 100, and depicts the area into which a video camera is placed. As shown, an opening and cavity 105 and flap, 106, is placed in the rear area of the toy and fitted with Velcro fasteners 106, 128 to allow closure of the cavity once the camera device is placed therein.

FIG. 3 illustrates the plush toy as it is employed with hands 104a, 104b, clasped together and fastened with Velcro fittings 102a, 102b. As shown, the plush toy is in a position to be secured around any area in the rear seat, including the rear seat headrests, so that the video camera is focused on the child.

Figure 4:
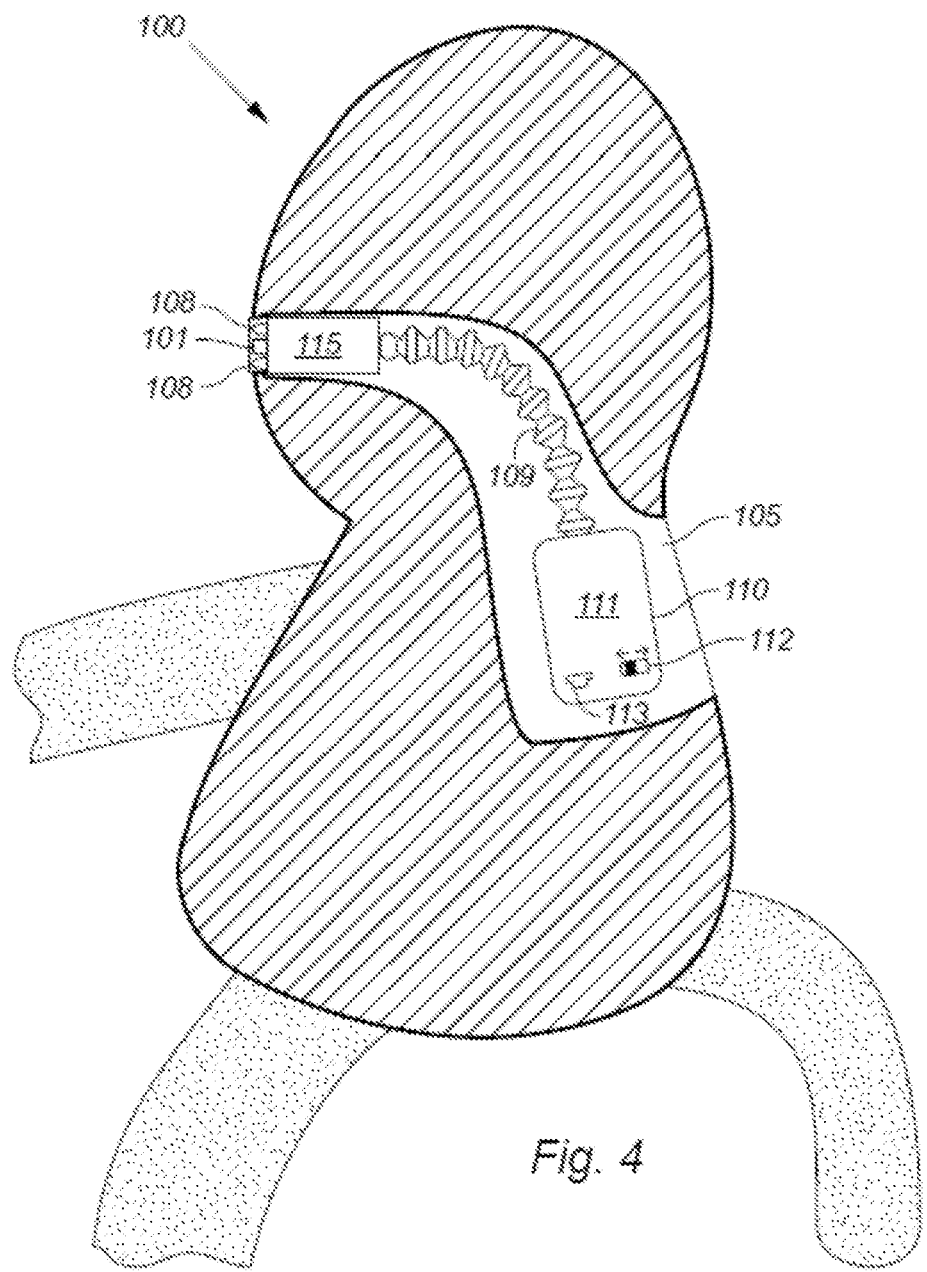
FIG. 4 depicts an inside view of the plush toy. Specifically, a profile of the plush toy, which can be any animal or other figure type, is shown with a cavity inside the toy with a battery pack, video signal transmitter, camera cable and camera lens fitted therein.

FIG. 4 illustrates a profile view of the plush toy 100. Specifically, the video camera 107 and camera lens 101 is situated within a camera housing 115. The camera is also fitted with an IR LED 108, or other appropriate device so that light is provided and the child is therefore visible to the camera lens in nighttime driving situations. The camera is depicted with a long cable housing 109 that runs the span of the toy from the nose to the power source and video signal transmitter, 110, 111. As shown, the invention provides a battery and transmitter pack, which houses both a video signal transmitter as well as battery/power source therein 110, 111. Further, the illustration depicts an on/off switch 112 employed on the battery pack housing 110 that holds a battery 111 such as for example, a lithium ion battery. As envisioned herein, the battery pack is rechargeable via use of a USB connection and charging port 113.

Figure 5:
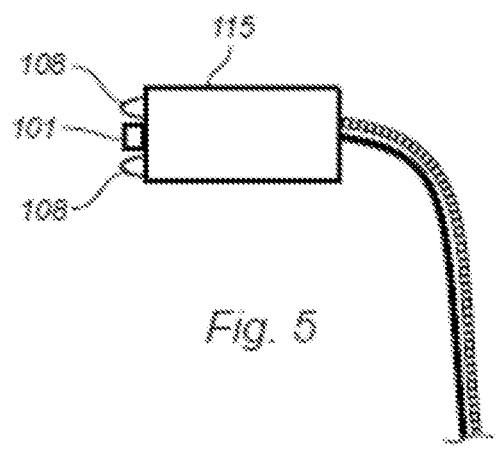
FIG. 5 depicts a side view of the camera lens as it is fitted into the head portion of the plush toy. As shown, the camera has an extension cable that leads to a battery or other electrical source of power.

FIG. 5 illustrates the particular elements of the camera lens 101 and camera housing 115. Specifically, LED lamps 108 are situated around the camera lens 101 to provide light in dark or nighttime driving situations.

Figure 6:
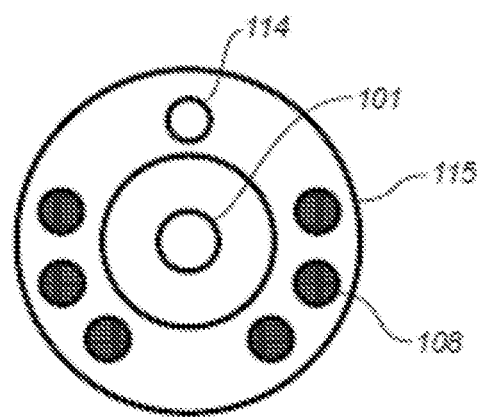
FIG. 6 depicts a forward facing view of the camera and camera lens.

FIG. 6 illustrates a close up view of the camera lens and housing 115 and elements related thereto. Specifically, the camera lens 101, is shown in the center surrounded by LED lights 108 that illuminate the video area. A night vision camera 114 is also envisioned herein for videotaping in dark, non-illuminated environments.

Figure 7:
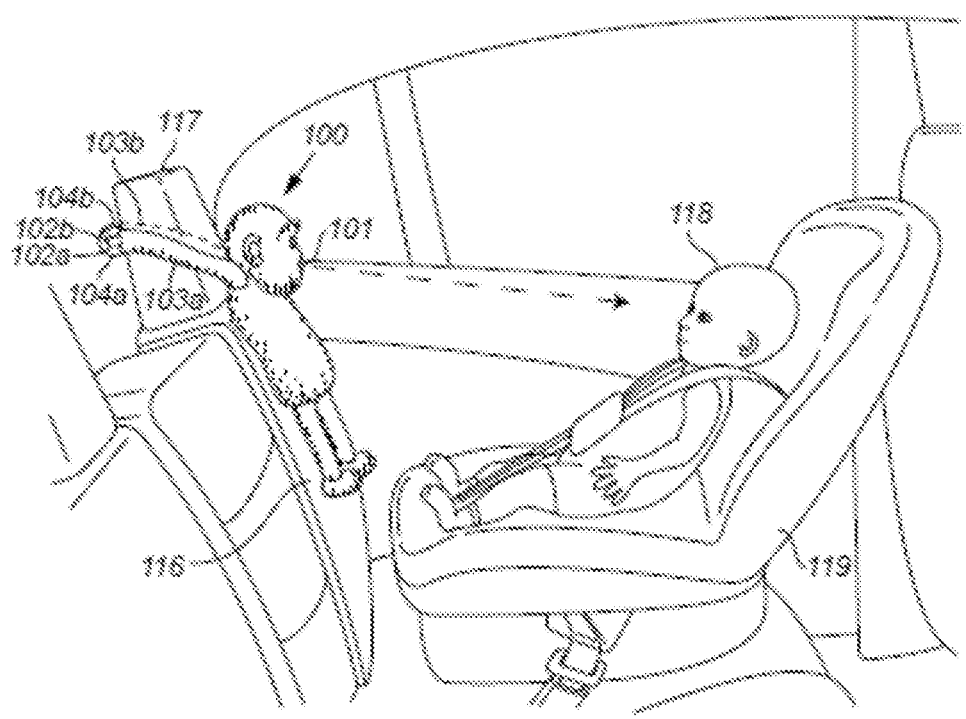
FIG. 7 depicts the claimed plush toy as it is fitted on the headrest of a vehicle. Specifically, the camera is placed facing the infant whom is placed in a rear facing infant child's seat.

FIG. 7 illustrates a view of the plush toy 100 as it is situated in the rear seat 116 of a vehicle compartment. As shown, the toy is secured to a headrest 117 or other appropriate area in the vehicle and secured by extending the toy's arms 103a, 103b which are fastened to one another with Velcro clasps 102a, 102b on the toy's hands 104a, 104b. As illustrated the child 118 faces rearward in a child car seat 119 in view of the video camera 101 located within the plush toy 100.

Figure 8:
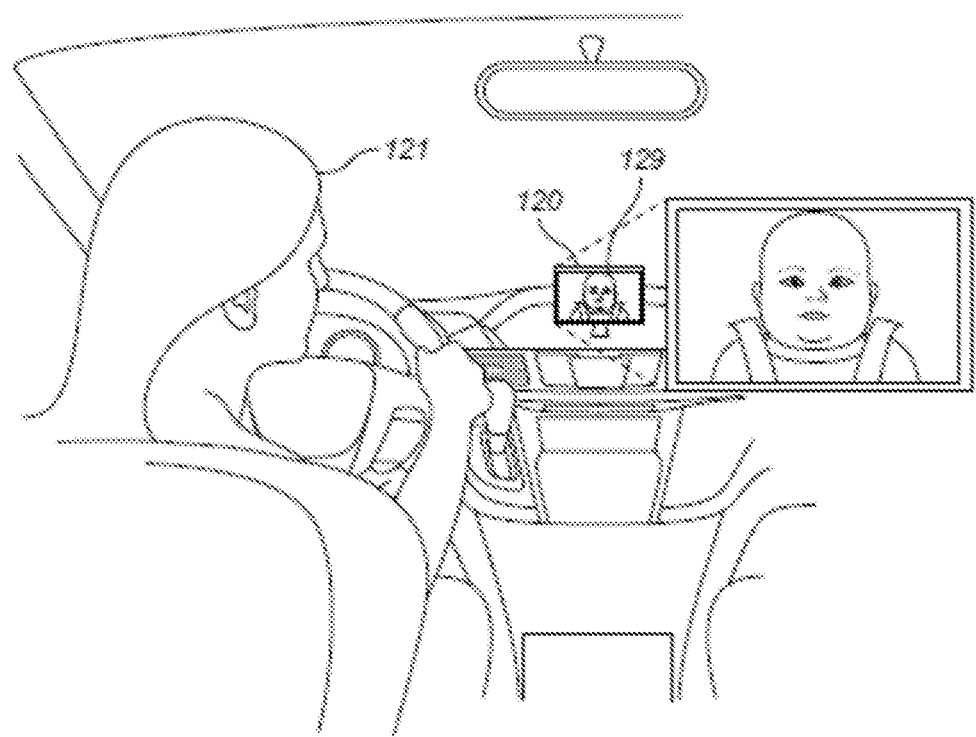
FIG. 8 depicts the camera video receiver that can be viewed by the driver of a vehicle fitted with the video camera device contained in the plush toy. As envisioned herein, the video receiver can be placed anywhere in the vehicle compartment which is viewable by the driver.

FIG. 8 illustrates the forward section of the vehicle compartment wherein the driver 121 can view the image of the child 129 on a video display receiver and monitor 120 that is mounted on the dashboard, windshield or other appropriate area in which the driver can view the video monitor display.

FIG. 9 illustrates a front view of the plush toy portable mounting device of the invention 122. As shown, the mount is configured with an upper portion 126 that enables a user to wrap the toy's arm and to secure the plush toy in the absence of a rear seat headrest. Also provided are slots 124 to allow the toy's arms to surround when secured to the mount. A plate 123 is also configured to provide support to the mount as it rests on the rear seat.

FIG. 10 illustrates a profile view of the toy mount 122. As shown, the upper portion 126 extends upwardly so that a user can wrap the toy's arms around during times of travel. Also provided is a spring mechanism 130 that allows flexibility of the mount so that it fits a variety of shapes and areas in the rear seat or rear compartment area. As the figure shows, the mount is configured with an extending clip 125 that can be fitted around the top portion of a seat 116 in order to secure the mount thereto. The lower portion of the mount 127 extends downwardly providing added security of the mount.

FIG. 11 illustrates a rear view of the toy mount 122. The illustration depicts the upper portion 126 used to secure the toy's arms thereto, the slots 124 that can be used to wrap the toy's arm around, the plate 123 that is employed to rest upon the rear seat and the lower portion 127 that extends downwardly to secure the mount to the rear seat or other area in the rear section of the vehicle compartment. Also provided is the securing clip 125 that holds the mount securely to the seat.

Figure 12:
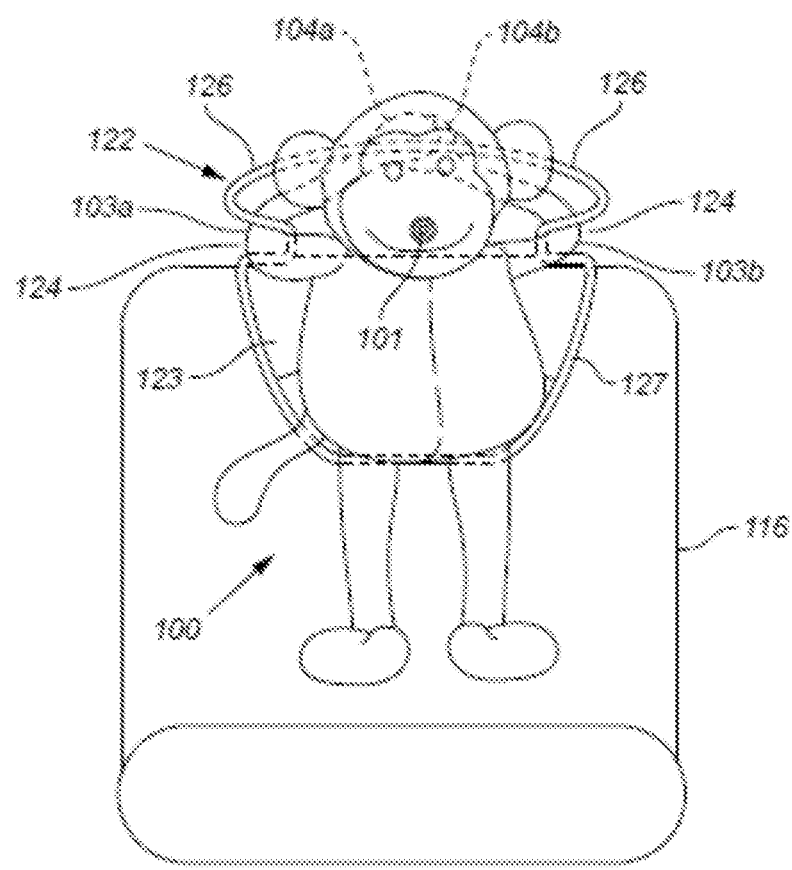
FIG. 12 depicts the basic configuration the toy mount, the toy fitted with a video camera with the toy's hands clasped in the rear section of the invention with the use of Velcro.

FIG. 12 illustrates the elements related to the plush toy 100 fitted with the video camera device 100. As shown, the toy is placed on the toy mount 122 on a rear seat 116 with the toy fitted with a camera and camera lens 101. The toy's arms 103a, 103b are wrapped around the mount 123, 124, 126 with support provided by the lower portion of the mount 127. As shown herein, the toy's arms are clasped at the toy's hands 104a, 104b.

Figure 13:
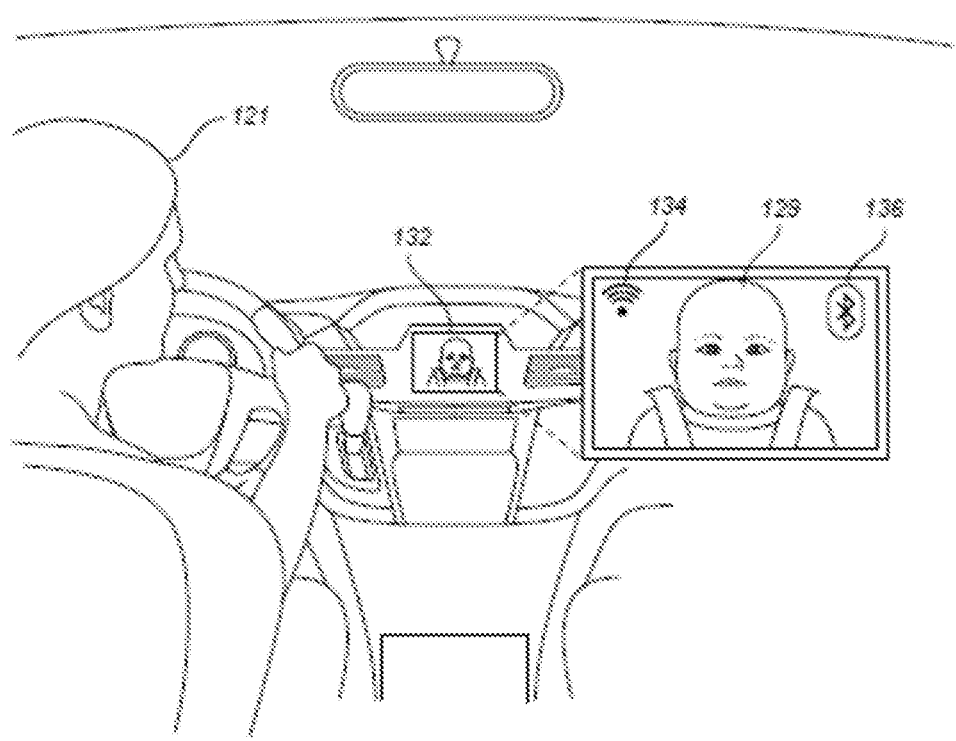
FIG. 13 illustrates a preferred embodiment of the invention wherein a Bluetooth device transmits images of a rearward facing child via a Wi-Fi source to the front compartment of a vehicle. In particular, a Bluetooth device incorporated into an "intelligent vehicle" is adjusted to connect with the invention so that images captured on the video camera are transmitted to the in-dash monitor of the "intelligent vehicle" dashboard.

FIG. 13 illustrates additional preferred embodiments of the invention. In particular, an in-dash monitor 132 typically provided in more modern "intelligent vehicles" is employed in combination with Bluetooth connectivity 136 and a Wi-Fi source 134 within the vehicle in order to transmit images of a child 129 seated in a rearward position of the rear section of the vehicle compartment. The driver 121 is then able to safely view the child without the need to hold her smart phone.

Figure 14:
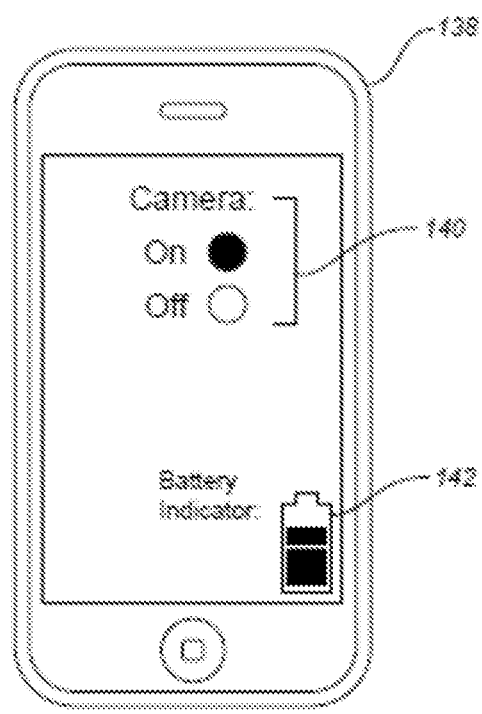
FIG. 14 illustrates an embodiment of the invention wherein a smart phone device has an "app" that is configured to operate the invention remotely. In particular, a user/driver installs the invention "app" onto a smart phone and controls the functionality of the invention from anywhere in the vehicle compartment and from any range of the Wi-Fi/Bluetooth connection.

FIG. 14 illustrates the "app" of the invention which provides remote access and control of the invention so that a user is able to activate and power on 146 the invention via use of the "app" on a smart phone 138. The user is also informed of the status of the camera by providing real time indicators that inform the user of that status for example, the remaining battery life of the rechargeable battery 142, level of connectivity to a Bluetooth device.

Figure 15:
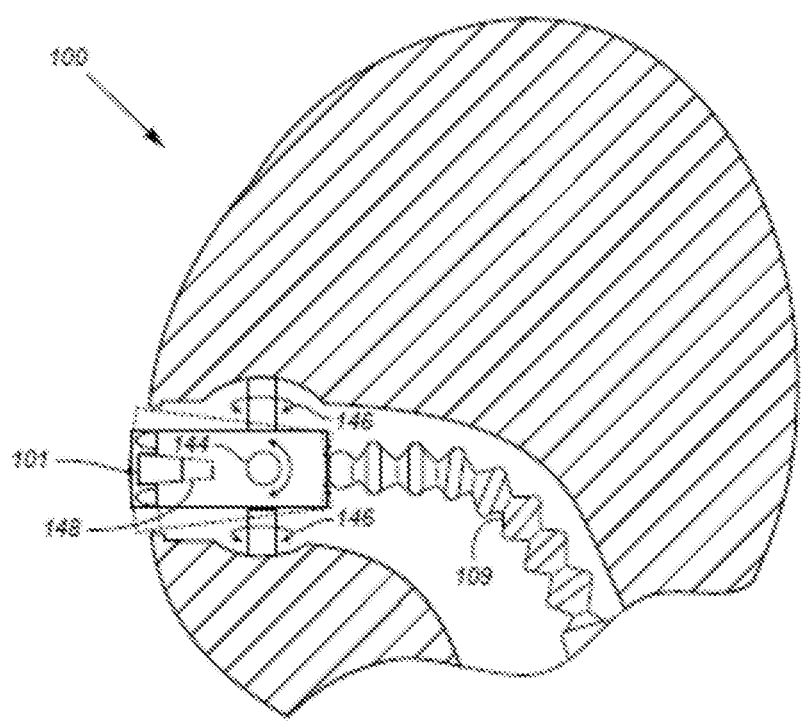
FIG. 15 illustrates the zoom feature of the video camera. In particular, the invention provides the functionality of zooming a video image so that a parent in the front compartment of the vehicle can see the child or children with greater detail.

FIG. 15 illustrates the zoom feature of the camera elements of the invention. In particular, the camera, housed within the head of a stuffed toy 100 is provided with the illustration depicting the camera and camera lens 101 configured with a zoom capability feature 148. With the zoom feature, a user/drive can zoom the camera video to view greater details of the images transmitted to the video monitor. Also depicted is a tilt capability 144 for the camera that enables a user to pan 146 and tilt 144 the camera to different areas of the rear section of the vehicle compartment for example, to view one or more children without the need for manual movement of the camera. As shown, the camera and pan/tilt features are configured with the flexible, rigid tubing 109 of the invention within the head section of the stuffed toy.

Figure 16:
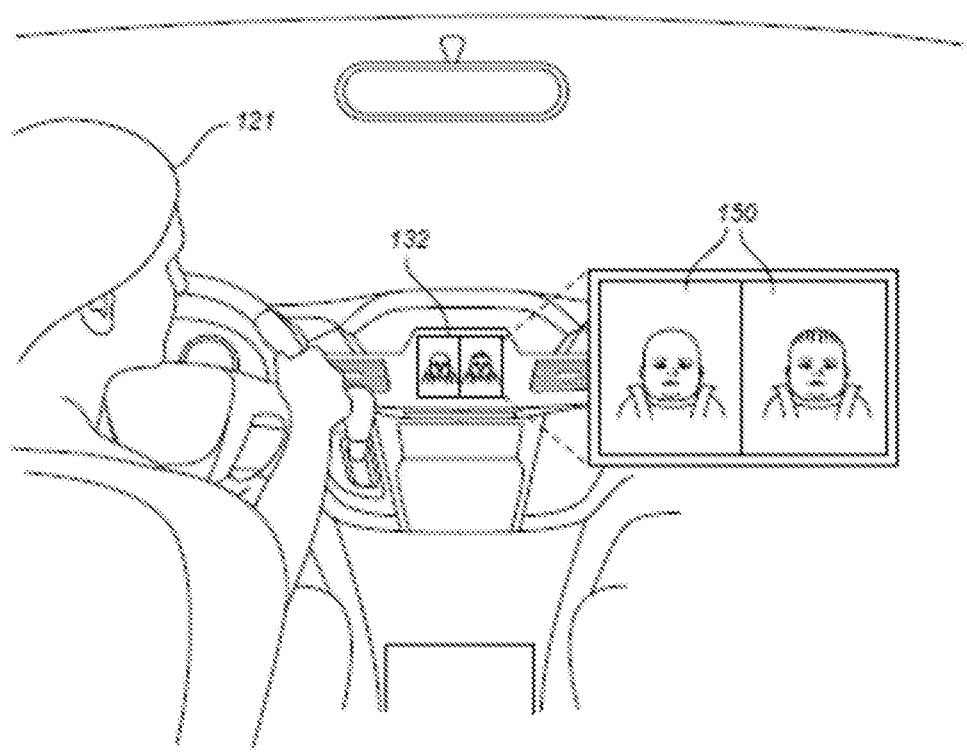
FIG. 16 illustrates a preferred embodiment of the invention wherein a Bluetooth device transmits split screen images of two different rearward facing children via a Wi-Fi source to the front compartment of a vehicle. In particular, a Bluetooth device incorporated into an "intelligent vehicle" is adjusted to connect with the invention so that images captured on the video camera are transmitted to the in-dash monitor of the "intelligent vehicle" dashboard, thus multiple children can be monitored simultaneously.

FIG. 16 illustrates an additional preferred embodiment of the invention that allows a user 121 to observe more than one child simultaneously. As shown, a split screen monitor 150 is configured within the dash board 132 of an "intelligent vehicle" with Bluetooth connectivity 136 and a Wi-Fi source 134.

Figure 17:
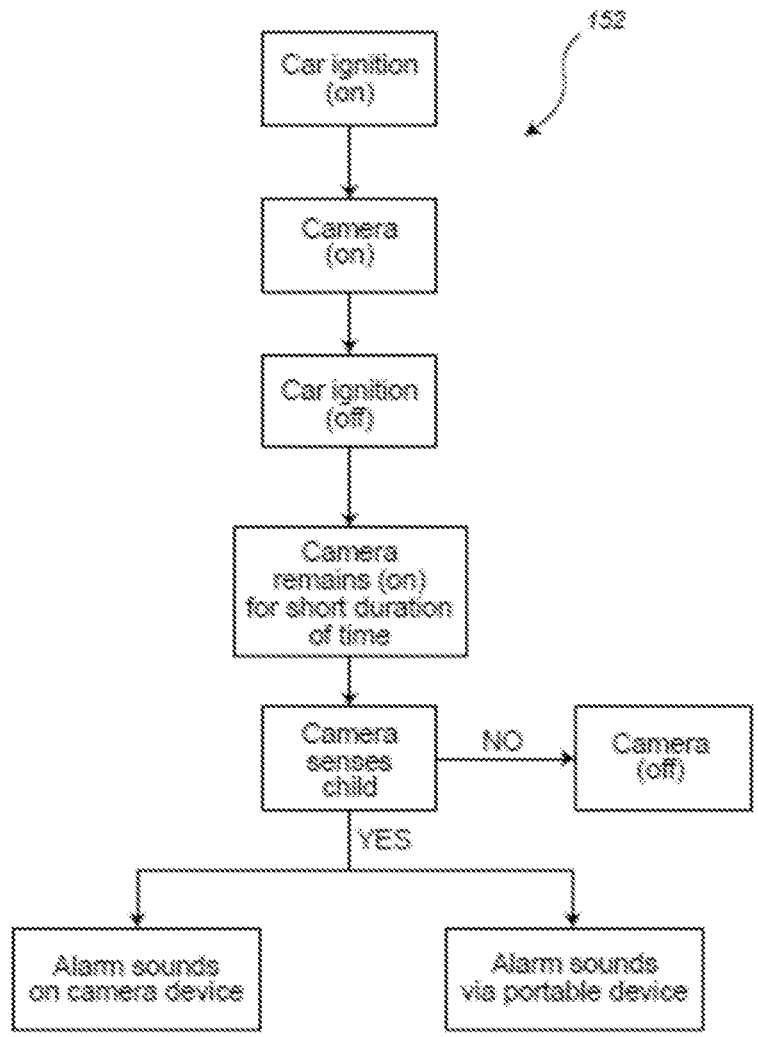
FIG. 17 is an illustrative flow chart of the operation of the invention pertaining to various functionalities associated therewith. In particular, the invention provides a safety feature wherein an adult is alerted if a child is inadvertently left unattended within the vehicle.

FIG. 17 provides a flow chart and decision tree that demonstrates a safety feature of the invention 152. In particular, the invention provides a safety measure that sounds an alerts if a child is inadvertently left within the vehicle after the vehicle has been turned off and the driver has exited the vehicle compartment.

Figure 18:
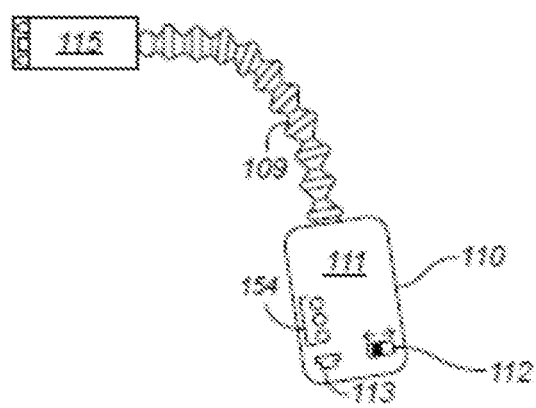
FIG. 18 illustrates the flexible, rigid tubing associated with the video camera of the invention. In a preferred embodiment, the camera is configured with a rechargeable lithium ion, or other comparable rechargeable battery, with recharging accomplished for example, through a USB charging port.

FIG. 18 illustrates a preferred embodiment of the power source of the invention. In particular, the camera 115 is connected to the battery source via the flexible, rigid tubing 109, in this example, a lithium ion battery 111 that is recharged via a USB connection 113 configured on the battery housing. LED lighting provides an indication of the status of remaining battery life 154 so that a user charges the battery when the battery charge is low.

Figure 19:
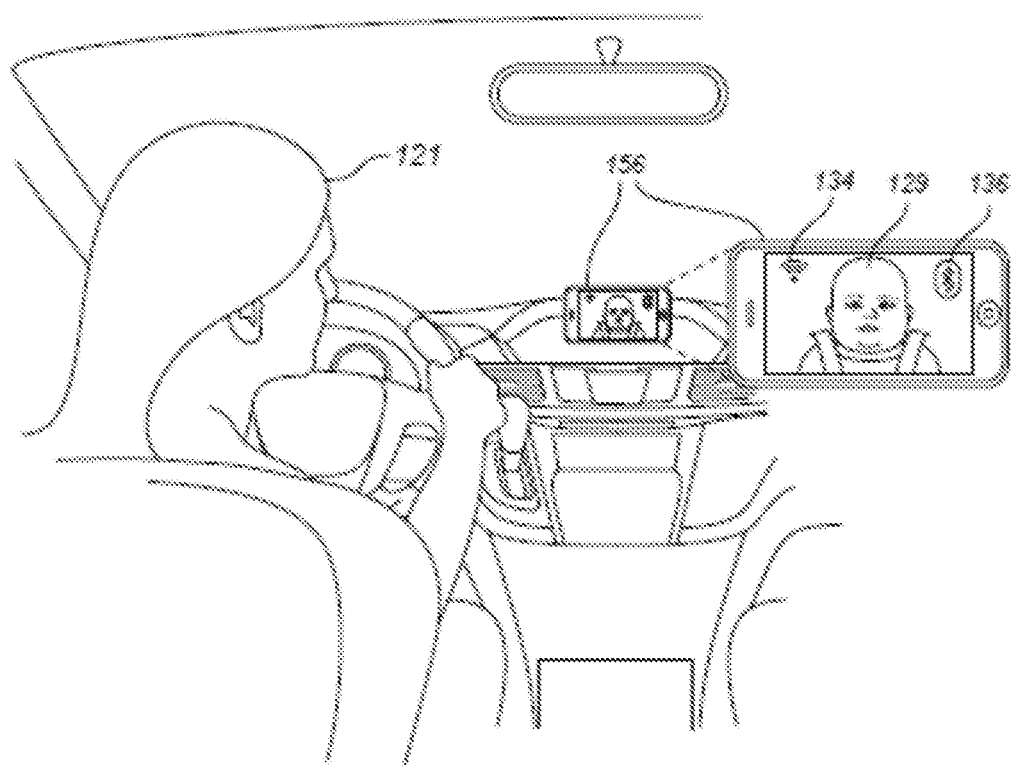
FIG. 19 illustrates a preferred embodiment of the invention wherein a Bluetooth device transmits images of a rearward facing child via a Wi-Fi source to the front compartment of a vehicle. In particular, a Bluetooth device incorporated into a "smart phone" or other device such as a tablet or the like, with an "app" of the invention is loaded is configured to connect with the invention so that images captured on the video camera are transmitted to the screen of the "smart phone".

FIG. 19 illustrates yet another preferred embodiment of the invention wherein a smart phone 156, loaded with an "app" of the invention, is employed in combination with Bluetooth connectivity 136 and a Wi-Fi source 134 within the vehicle in order to transmit images of a child 129 seated in a rearward position of the rear section of the vehicle compartment. The driver 121 is then able to safely view the child without the need of turning around to look at the child, or children.

The present invention is directed to a system and methods that allow a user to monitor by visual display means a child placed in a backseat child safety seat eliminating the need for the user to have to turn his or her back during periods of driving Advantages of the invention over that known in the art include the ability to adjust the direction in which the camera unit is pointed at the child, leaving the possibility of monitoring multiple children simultaneously. Still yet another advantage of the invention is that it allows a user to place the camera unit in multiple vantage points within the vehicle compartment by either securing the camera unit to a headrest or by employing use of the optional mounting device described herein. The optionally mounting device also provides additional flexibility to the user because the mount itself can be adjusted in a variety of ways such as vertically and horizontally by use of the optional adjustable belt strap. Further, the invention offers the advantage of allowing a user to record video, via a SD memory card, of the child at all times during travel.

Although the invention has been described with reference to the above description, it will be understood that modifications and variations are encompassed within the spirit and scope of the invention. Accordingly, the invention is limited only by the following claims.

What is claimed is:

1. A system comprising:
a video surveillance system for monitoring one or more children seated in the rearward compartment of a vehicle, the video surveillance system comprising a non-stationary video camera housed within a child's toy, wherein the camera further comprises an illumination source, the video camera configured within the head of the toy, wherein the video camera comprises a video camera cable that connects the non-stationary video camera with a power source and a video signal transmitter, wherein the flexible, rigid tubing and the camera cable are 6 inches in length and wherein the camera is fitted with night vision capable functionality:
the toy further comprising arms that can be wrapped around items located in the rearward compartment of the vehicle in order to secure the toy in a desired location;
a video display monitor wherein the display monitor is secured in an area within view of a driver of the vehicle, the video display monitor being linked remotely with the video camera, wherein the video camera is configured to transmit video images to the video display monitor;
a flexible, rigid tubing within the neck of the toy that houses video cable wiring connecting the video camera to a power source wherein the flexible rigid tubing is adjustable so that the video camera can be manually or remotely directed in any desired direction within the vehicle compartment in order to view the one or more children wherein the video cable wiring provides an electrical connection between the camera and a power source, the power source being rechargeable, wherein a smart phone is linked to the camera by means of a Bluetooth or Wi-Fi connection, wherein the smart phone comprises an "app" which allows a smart phone user to view images of the child transmitted from said camera by means of said Bluetooth or Wi-Fi connection, wherein the "app" remotely adjusts the non-stationary video camera and flexible, rigid tubing so that the video camera can be directed in any desired direction within the vehicle compartment in order to view the one or more children,
a portable, detachable mounting device, the portable, detachable mounting device consisting of a narrow 10 cm wide wedge secured to a desired area of the rearward compartment of the vehicle in close proximity to the one or more children to be viewed, wherein the wedge comprises a rigid material at the top half of the wedge and a flexible material at the bottom half of the wedge, the wedge further consisting of a wing nut at the base of the wedge that allows a user to adjust the height and position of the wedge, wherein the video surveillance system further comprises a means of mounting the toy with the detachable, portable mounting device in a desired location within the rear vehicle compartment, wherein the vehicle lacks a headrest on the rear seat, wherein the toy is mounted on the portable, detachable mounting device by fastening the toy's arms around the portable, detachable mounting device in a loop, the detachable, portable mounting device further comprising an upper portion which is adjustable by means of a spring which allows the detachable, portable mounting device to be secured to items of varying widths which are located in the rearward compartment of a vehicle, wherein the system comprises a temperature and battery life indicator wherein video images are transmitted to the in-dash monitor of the intelligent vehicle by Wi-Fi or Bluetooth connectivity; wherein the monitor is a split screen monitor wherein more than one child is monitored simultaneously; wherein a user is alerted as to the presence of a child situated in the rearward compartment of the vehicle following turning the ignition of the vehicle off, wherein the alert is sent to the user's smart device.

2. The video surveillance system of claim 1 wherein the illumination source comprises one or more LED lights.

3. The video surveillance system of claim 2 wherein the detachable, portable mounting device comprises a device that is mounted in a vehicle equipped either with or without a headrest.

4. The video surveillance system of claim 1 wherein the battery-pack comprises a rechargeable battery.

5. The video surveillance system of claim 4 wherein the system connects to the computer of an intelligent vehicle configured with Bluetooth connectivity and a Wi-Fi source.

6. The video surveillance system of claim 1 wherein the video camera is turned on or off remotely by a remote control.

7. The video surveillance system of claim 1 wherein the video camera is turned on or off remotely by means of an "app" loaded onto a smart device.

8. The video surveillance system of claim 1 wherein the video camera pans, tilts or zooms.

9. The video surveillance of claim 1 wherein the system transmits music to a speaker configured in the head of the toy, the music streamed to the speaker via Wi-Fi or Bluetooth connectivity with the vehicle or user's smart device.

10. The video surveillance system of claim 9 wherein the music is streamed from an internet source or from a user's smart device library, or from the vehicle's internal sound system.

11. The video surveillance system of claim 10 wherein the system comprises a microphone and speaker so that there is two-way communication between the child and driver of the vehicle.

12. A method of monitoring one or more children seated in a vehicle, the method comprising:
capturing video images of the one or more children when the children are seated in the rearward compartment of a vehicle with a video surveillance system, the system comprising a non-stationary video camera configured within the head of a child's toy, wherein the video camera is fitted with illumination lighting and night vision capability, wherein a smart phone is linked to the camera by means of a Bluetooth or Wi-Fi connection, wherein the smart phone comprises an "app" which allows a smart phone user to view images of the child transmitted from said camera by means of said Bluetooth or Wi-Fi connection, wherein the "app" remotely adjusts the non-stationary video camera and flexible, rigid tubing so that the video camera can be directed in any desired direction within the vehicle compartment in order to view the one or more children, the toy further comprising toy arms, the system further comprising an adjustable, flexible rigid tubing within the neck of the toy the adjustable, wherein the flexible rigid tubing houses video cable wiring that connects the video camera to a power source; the video surveillance system further comprising a video display monitor wherein the display monitor is secured in an area within view of a driver of the vehicle;
remotely linking the video display monitor with the video camera, wherein the video camera is configured to transmit video images to the video display monitor, wherein the video camera comprises a video camera cable that connects the non-stationary video camera with a power source and a video signal transmitter, wherein the flexible, rigid tubing and the camera cable are 6 inches in length wherein the camera is fitted with night vision capable functionality;
securing a portable, detachable mounting device to a desired area of the rearward compartment of the vehicle, the portable, detachable mounting device consisting of a narrow 10 cm wide wedge wherein, the wedge comprises a rigid material at the top half of the wedge and a flexible material at the bottom half of the wedge, the wedge further consisting of a wing nut at the base of the wedge that allows a user to adjust the height and position of the wedge;
wrapping the toy's arms around the portable, detachable mounting device by fastening the toy's arms in a loop around the mounting device so that the toy is secured to the mounting device;
manually or remotely adjusting the toy's head and the flexible rigid tubing within the toy so that the non-stationary video camera is directed in any desired location within the vehicle compartment in order to view the child;
viewing the one or more children so to ensure the safety of the one or more children during transit in the vehicle, wherein the system comprises a temperature and battery life indicator wherein video images are transmitted to the in-dash monitor of the intelligent vehicle by Wi-Fi or Bluetooth connectivity; wherein the video camera pans, tilts or zooms and wherein the monitor is a split screen monitor wherein more than one child is monitored simultaneously; wherein the user is alerted as to the presence of a child situated in the rearward compartment of the vehicle after the vehicle has been turned off, wherein the alert is sent to the user's smart device.

13. The method of claim 12 wherein the system transmits music to a speaker configured in the head of the toy, the music streamed to the speaker via Wi-Fi or Bluetooth connectivity with the vehicle or user's smart device.

14. The method of claim 12 wherein the system comprises a microphone and speaker so that there is two-way communication between the child and driver of the vehicle.

* * * * *